United States Patent Office 3,816,587
Patented June 11, 1974

3,816,587
SELECTIVE CONCENTRATION OF GOLD, SILVER AND COPPER IN AQUEOUS CYANIDE SOLUTIONS
Lawrence Wayne Gosser, Wilmington, Del., assignor to E. I. du Pont de Nemours and Company, Wilmington, Del.
No Drawing. Filed Apr. 17, 1972, Ser. No. 244,880
Int. Cl. B01d 11/00; C01g 5/00, 7/00
U.S. Cl. 423—29                9 Claims

ABSTRACT OF THE DISCLOSURE

Disclosed herein is a reverse osmosis process for concentrating aqueous solutions of the cyanide complex salts of gold, silver and copper employing membranes fashioned from selected nitrogen-linked aromatic condensaton polymers.

BACKGROUND OF THE INVENTION

(1) Field of the invention

This invention concerns a reverse osmosis process for concentrating gold, silver and copper in aqueous cyanide solutions employing membranes of nitrogen-containing aromatic condensation polymers. This invention is especially pertinent to mining operations for these metals.

(2) Description of the prior art

Gold-bearing ores have been leached with aqueous alkali and alkaline earth metal cyanides to obtain aqueous solutions of the soluble complex cyanides of gold, silver and copper. If the content of gold, silver and copper is high enough, they can be economically recovered from solution by electrodeposition or by precipitation with amalgamated zinc. With more dilute cyanide solutions, however, the electrodeposition and zinc precipitation methods are uneconomical and an alternative method of recovery must be employed. The alternative of absorbing the metal cyanides on activated carbon has been employed but requires the additional process step of separating the metals from the carbon.

The membranes employed in the novel reverse osmosis process are known to be useful for nonanalogous water desalination; see coassigned U.S. 3,567,632. It is also known to employ cellulose acetate membranes in a nonanalogous process of removing gold, silver and copper from plating waste solutions; Sourirajan, "Reverse Osmosis," (1970), Chapter 8. Cellulose acetate membranes are rapidly degraded by hydrolysis under the aqueous alkaline conditions present herein.

SUMMARY OF THE INVENTION

The novel process is applicable to any operation involving gold, silver and copper cyanide complexes in aqueous solutions wherein said complexes are sought to be concentrated. The process is particularly applicable to a leaching operation comprising obtaining aqueous solutions of the soluble complex cyanides of gold, silver and copper (from, say, gold-bearing ores) by employing aqueous alkali and/or aqueous alkaline earth metal cyanides as leachants. The leach liquid in such an operation contains the gold, silver and copper cyanides as well as one or more alkali or alkaline earth cyanides.

A semi-permeable membrane is employed in concentrating the cyanides. Particular nitrogen-linked aromatic condensation polymers employed as the semi-permeable membrane(s) allow for the reverse osmosis concentration by a process comprising contacting one surface of said membrane with the leach liquid at an applied pressure greater than the osmotic pressure, and concentrating the gold, silver and copper complex cyanides on the side of the membrane first contacted by the leach liquid some of which flows through said membrane.

The reverse osmosis process of this invention means that the metal ions gold, silver and copper are retained by the membrane while the solvent passes through. This process is basically different from dialysis processes employing dialyis-type membranes and pasing the metal ions through the membranes.

The particular cyanide complexes that are concentrated by the process of this invention are one or more of

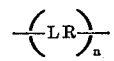 Au(CN)$_2^\ominus$    Dicyanoaurate(I)

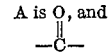 Ag(CN)$_2^\ominus$    Dicyanoargentate(I)

 Cu(CN)$_2^\ominus$    Dicyanocuprate(I)

 Cu(CN)$_3^\ominus$    Tricyanocuprate(I)

 Cu(CN)$_4^\ominus$    Tetracyanocuprate(I)

In leach solutions obtained by leaching with, say, aqueous sodium cyanide, potassium cyanide or calcium cyanide, the gold, silver and copper complex ions are balanced in solution with corresponding sodium, potassium, or calcium ions.

The Membranes

The selected polymers employed as membranes in the process of this invention consist essentially of at least one synthetic organic nitrogen-linked aromatic polymer represented by the formula

$$-(L\,R)_n-$$

where (a) each L independently, (L$^1$, L$^2$, etc.), is a divalent linking group of the formula —(A$_i$B$_j$A$_k$B$_l$A$_m$)—, wherein A is O, and
$$-\overset{\underset{\parallel}{O}}{C}-$$

B is Z
$$-\overset{\underset{|}{Z}}{N}-$$

or vice versa; each Z independently is H, lower alkyl or phenyl, provided that at least ¼ of the Z's in the polymer are H; and all non-terminal $$-\overset{\underset{|}{Z}}{N}-'s$$

occur in pairs; $i$ and $j$ each represents the numerals 1 or 2; $k$, $l$, and $m$ each represent the numerals 0, 1, or 2; provided that if $l=0$, then $m=0$; and if $k=0$, then $l=0$; and further that $i+j+k+l+m \leqslant 8$;

(b) each R independently, (R$^1$, R$^2$, etc.) is a divalent organic radical, both of whose terminal atoms are carbon atoms, at least about ½ of all such terminal atoms bonded to $$-\overset{\underset{\parallel}{O}}{C}-$$

and at least about ⅔ of all such terminal atoms bonded to $$-\overset{\underset{|}{Z}}{N}-$$

in the L links being members of aromatic nuclei; and such that (i) $(\overline{N}_R)/(\bar{s})$ is less than about 10, (ii) $f_m$ is less than about 1/5, and (iii) P.I. is less than about 1/500, where: $N_R = N_R° - 10 N_I - N_H$, $N_R° =$ (number of atoms in R, exclusive of H-atoms) $\leqslant 50$, $N_I =$ number of ionic groups in R, $N_H =$ number of H-bonding units contributed by polar groups in R, $\bar{N}_R$=average value of $N_R$ for the polymer, $s=\frac{1}{2}$ ((the number of

groups in L)+1), $\bar{s}$=average value of $s$ for the polymer, $$f_m = \frac{\text{(number of single-strand —M— links in the polymer chain)}}{\text{(total number of atoms, exclusive of H-atoms in polymer chain)}},$$

M=any atom in R linking the polymer chain solely through two single bonds, $$P.I. = \frac{\text{(total number of pendant ionic groups in the polymer)}}{\text{(polymer molecular weight)}},$$

(c) $n$ is an integer sufficiently large to provide film-forming molecular weight, and
(d) the polymer has a solubility of at least about 10% by weight of a medium consisting of 0–3% by weight of lithium chloride in a solvent selected from the group consisting of dimethylacetamide, dimethylsulfoxide, N-methyl pyrrolidone, hexamethyl phosphoramide, and mixtures thereof at 25° C.

Depending upon the number of units, $n$, there are in the polymer, $$-(L R)_n-,$$

there may be several values for L and several values for R which can be represented as $L^1$, $L^2$, $L^3$, etc., and as $R^1$, $R^2$, $R^3$, etc. Particular polymers useful for the membranes of this invention are those in which there are two values for L—$L^1$ and $L^2$— and two values for R—$R^1$ and $R^2$. Following are particularly contemplated membrane polymers of this invention.

In the polyamide hydrazide of Example 1, Part A, the repeating unit is made up of the following:

$L^1$ is

$R^1$ is 80% m-phenylene and 20% p-phenylene
$L^2$ is

$R^2$ is m-phenylene.

In the polyamide of Example 6, Part A, the repeating unit is made up of the following:

$L^1$ is

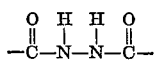

$R^1$ is p-phenylene
$L^2$ is

$R^2$ is m-phenylene.

In the polyhydrazide prepared from isophthalic dihydrazide and terephthaloyl chloride, the repeating unit is made up of the following:

$L^1$ is

$R^1$ is m-phenylene
$L^2$ is

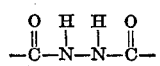

$R^2$ is m-phenylene.

In the polysemicarbazide prepared from isophthalic dihydrazide and methylenebis(4-phenylisocyanate), the repeating unit is made up of the following:

$L^1$ is

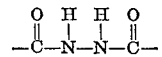

$R^1$ is m-phenylene
$L^2$ is

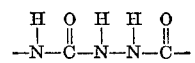

$R^2$ is

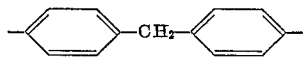

In the polyurea prepared from 2,2-bis(4-aminophenyl)-propane and bis(4-isocyanatophenyl)methane, the repeating unit is made up of the following:

$L^1$ is

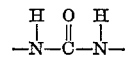

$R^1$ is

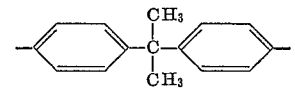

$L^2$ is

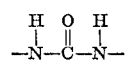

$R^2$ is

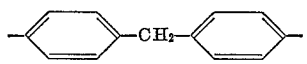

The improved process of this invention makes it possible to start with a dilute aqueous solution of the complex cyanides of copper, silver and gold and in a single step concentrate it so that the metal values can be economically recovered by conventional commercial processes such as electrodeposition or zinc precipitation. The dilute starting solution can be one obtained by aqueous cyanide leaching of low grade ore or mine tailings or it can be an exhaust liquor from metal recovery by electrodeposition or zinc precipitation.

DETAILS OF THE INVENTION

Particular aromatic polymers, embraced by the formula given above, and found to be useful herein are (1) aromatic polyamides, (2) aromatic polyacyl hydrazides, (3) aromatic polysemicarbazides and (4) aromatic polyureas, the preparation of which are fully described in coassigned U.S. Pats. 3,094,511; 3,130,182; 3,004,945; and 2,888,438, respectively. In brief, said preparations involve (1) reacting an aromatic diacid chloride with an aromatic diamine, the acid groups of the diacid chloride and the amine groups of the diamine being $m$ or $p$ relative to each other
(2) reacting hydrazine or an aromatic dihydrazide with an aromatic diacid chloride in a solvent medium
(3) reacting an aromatic diisocyanate with a dihydrazide derived from an aromatic diacid, and
(4) reacting an aromatic diisocyanate with an aromatic diamine.

It is preferred to employ as membranes polymers as defined above in the form of asymmetric membranes, characterized as having a thin, dense skin layer overlying a relatively porous, less dense substrate of the same polymer and integral therewith. The contemplated membranes are made, preferably, by casting or spinning from solution in an organic solvent such as N,N-dimethylacetamide, dimethyl sulfoxide, and the like, as more fully described in coassigned U.S. Pat. 3,567,632. The membranes may vary from 0.1 to 25 mils in thickness and are preferably from 0.5 to 10 mils in thickness.

The present process can be conducted at temperatures anywhere in the range from 0° to 100° C. However, in the very low part of this range, it is difficult to maintain solubility, and high temperatures may accelerate deterioration of the membrane. Accordingly, it is preferred to operate in the temperature range from 15° to 50° C.

The pressure against the membrane can vary from the osmotic pressure of the feed liquid up to the rupture strength of the membrane. At pressures near the osmotic pressure flow rates are slow. Maintaining pressures near the rupture strength of the membrane for long periods of time can damage the membrane. It is preferred to operate at presures in the range of 100 to 2500 lb./sq. in. (p.s.i.).

Typical Apparatus

This invention is not limited to a particular apparatus and those skilled in the art with the description provided herein will know how to practice it. A typical apparatus, however, will be briefly described, with more details available from coassigned U.S. Pats. 3,567,632 and 3,497,451. The typical apparatus is an enclosed corrosion resistant cell with an inlet port for the leach liquid and a reverse osmosis membrane mounted in the cell so that liquid permeate passing therethrough can be collected through an outlet and, perhaps, recycled. The cell will also contain an outlet for the leach liquid in which the gold, silver and copper cyanides are concentrated. The outlet for the concentrated cyanides will be on the side of the membrane that is initially contacted with leach liquid. Means may be provided for maintaining a pressure in the cell sufficiently greater than in the permeate outlet to overcome the osmotic pressure. Means may also be provided for stirring the fluid in the cell to insure a contact of fresh fluid with the membrane at all times. Other similarly designed cells may also be employed and most preferred are those that avoid (as in the described apparatus) the development of a stagnant layer of concentrated solution near the membrane. The membrane can be in the form of a film, folded film, tube(s), hollow fiber(s), or the like.

The cyanide solutions employed in this invention are alkaline and the process is employed with aqueous solutions having pH in the range of 7 to 13. It is preferred to operate in the pH range from 7 to 10. A particular virtue of the membranes disclosed herein is their great hydrolytic stability in this pH range.

The concentration of the gold, silver and copper in the feed liquid can vary widely, say, from 1 to 5000 parts per million (p.p.m.) for each metal. In addition, there can be present in the feed liquid low concentrations (up to about 0.5% by weight of the liquid) of inert soluble materials. However, for best results, the feed liquid should be freed of solid materials by filtering, settling or the like to avoid damage to the semi-permeable membrane and to prevent blockage of the equipment used.

DESCRIPTION OF THE PREFERRED EMBODIMENTS

The following Examples are meant to illustrate but not to limit the invention. Parts are by weight unless otherwise specified. The abbreviation GFD is used to designate the rate of permeate flow and represents gallons per square foot per day.

EXAMPLE 1

Part A

A polymer was prepared by condensation of a mixture of 80 parts of 3-aminobenzhydrazide and 20 parts of 4-aminobenzhydrazide and a stoichiometrically equivalent amount of a mixture of 70 parts of isophthaloyl chloride and 30 parts of terephthaloyl chloride in dimethylacetamide solution. This polymer was isolated by pouring the condensation mass into ice water, washing free of acid, and drying.

Part B

The polyamide hydrazide of Part A, was formed into an asymmetric membrane by the following procedure: A casting solution was prepared with the following composition by weight:

|  | Percent |
| --- | --- |
| Polymer as in Example 1A | 15.5 |
| LiNO$_3$ | 4.65 |
| 2,11-Diacetyl-2,11-diaza-5,8-dioxadodecane | 6.2 |
| Triethanolamine | 0.08 |
| Dimethylacetamide | 73.57 |

The solution was filtered through a 0.45μ silver filter. The resulting solution had a viscosity of 20,000 centistockes at 25° C. A seamless tubular membrane was formed by depositing the polymer solution at ambient temperature inside a 1.003" I.D. vertical glass column with the aid of a conical spreader. The latter was moved through the glass column with air pressure at a velocity which avoided entrapment of air bubbles inside the solution layer. Wet film thickness was 0.015 inch. The glass tube with the polymer film on the inside was placed in a vertical heater. Air heated to 80° C. was passed through the tube at 800 f./min. for 25 minutes. Electric heaters were set to give a steady state tube wall temperature of 100° C. The glass tube was then removed from the heater and allowed to cool for 5 minutes while a stream of ambient air flowed through the tube at 800 ft./minute. The salt, the plasticizer and residual dimethylacetamide were removed by extraction with methanol. The extract stream was circulated through the glass tube at 6.9 ft./min. for 60 minutes. The tubular membrane was then slipped out of the glass tube into water and stored wet.

Part C

A section of the wet tubular membrane from Part B was slit open and mounted flat in an apparatus such as has been described with the skin side of the film on the feed side of the cell (permeator). A feed solution was prepared by dissolving 0.50 g. of KCN, 0.30 g. of $$K_3Cu(CN)_4,$$

0.30 g. of AgCN and 0.10 g. of KAu(CN), in 250 ml. of distilled water. This was placed in the permeator under a pressure of 400 p.s.i. Under these conditions, permeate passed through the membrane at a rate of 7 gallons per square foot per day (g.f.d.). When the volume of the feed solution had decreased about 10%, samples of the feed and the permeate solutions were analyzed by atomic absorption. Concentrations of the metals in parts per million (p.p.m.), along with the percent passage calculated therefrom are shown in the Table.

EXAMPLE 2

The procedure of Example 1 was repeated except that in the permeation step a different pressure and therefore a different flow rate was employed as set out in the Table along with the corresponding analyses and percent passage calculations.

EXAMPLE 3

Part A

A dimethylacetamide solution was prepared containing 15% by weight of the polyamide hydrazide of Example 1, Part A, 4.5% of LiNO₃ and 6% of 2,11-diacetyl-2,11-diaza-5,8-dioxadodecane. A 0.015-inch film of this solution was spread on a glass plate heated at 100° C. After standing in air for 5 minutes at 100° C., the coated plate was immersed in water at 5° C. After thorough extraction with water, the film with asymmetric, i.e., it had a thin skin of dense polyamide hydrazide supported by a less dense form of the same polymer. The dimethylacetamide, LiNO₃ and 2,11-diacetyl-2,11-diaza-5,8-doxadodecane were substantially all leached out of the film.

Part B

The film from Part A was used in a permeation procedure like that of Example 1, Part C except that a different pressure was used, resulting in a different flow rate and with the analyses and percent passage calculations as shown in the Table.

EXAMPLES 4-5

The procedure of Example 3 was repeated except that in the permeation step different pressures and therefore different flow rates were employed as set out in the Table along with the corresponding analyses and percent passage calculations.

EXAMPLE 6

Part A

An aromatic polyamide copolymer was prepared as follows:

A resin kettle was swept with dry nitrogen and was charged with 32 moles of N,N-dimethylacetamide and 2.36 moles of meta-phenylenediamine. The solution was cooled to a temperature of 0° to −10° C. at the start and the solution was maintained below 20° C. while the bulk of a molecularly equivalent amount of molten 70% isophthaloyl chloride-30% terephthaloyl chloride mixture was added in about 0.5-mole increments at 5-minute intervals with agitation. The size of the increments was decreased as the reaction progressed. Finally cooling was stopped and the temperature of the solution was allowed to rise to 40-50° C. Completeness of reaction was checked by spot testing with p-dimethylaminobenzaldehyde (an aromatic amine end group indicator) in dimethylacetamide until the intense yellow color, which indicates the presence of unreacted amine groups, no longer appeared.

The polymer was isolated by diluting it with dimethylacetamide to a polymer content of about 9% and placing the solution in a high speed Waring Blendor. Crushed ice was added slowly until precipitation began, after which the mixture was stirred rapidly and additional ice was added. The precipitated polymer was filtered and washed with water. Drying was accomplished in a vacuum oven at 80° C. until the water content was below 4%.

Part B

A dimethylacetamide solution containing 15% by weight of the polyamide of Part A and 5.25% of LiCl was cast as a 0.015-inch film on a glass plate heated at 100° C. After standing in air for 5 minutes at 100° C., the coated plate was immersed in water at 75° C. After thorough extraction with water, the resulting asymmetric film was separated from the plate and stored in water until used.

Part C

A section of film from Part B was mounted in the apparatus of Example 1 with the skin side of the film on the feed side of the permeator. A feed solution as shown in Example 1, Part C, was placed in the permeator under a pressure of 750 p.s.i. Under these conditions, permeate passed through the membrane at a rate of 2.7 g.f.d. When the volume of feed solution had decreased about 10%, samples of the feed and permeate solutions were analyzed by atomic absorption. Concentrations of the metals in parts per million along with the percent passage calculated therefrom are shown in the Table.

EXAMPLE 7

Part A

An aromatic polyamide having sulfonic acid salt groups was prepared by adding a mixture of 70 parts of isophthaloyl chloride and 30 parts of terephthaloyl chloride gradually to a dimethylacetamide solution of a substantially stoichiometric amount of a mixture of 80 parts of m-phenylenediamine and 20 parts of the calcium salt of m-phenylenediamine-4-sulfonic acid. The mixture was stirred 24 hours at room temperature. The resulting polymer was isolated by precipitation in water, washing in water and drying.

Part B

A dimethylacetamide solution was prepared containing 15% by weight of the polyamide sulfonate salt of Part A, 3% of LinNO₃ and 6% of 1,11-diacetyl-2,11-diaza-5,8-dioxadodecane. This solution was cast as a film, quenched in water and the film recovered using the procedure of Example 3, Part A.

Part C

A section of film from Part B above was mounted in the apparatus of Example 1 with the skin side of the membrane on the feed side of the permeator. A feed solution was prepared as in Example 1, Part C, and placed in the permeator under a pressure of 750 p.s.i. Under these conditions, permeate passed through the membrane at a rate of 7.5 g.f.d. When the volume of feed solution had decreased about 10%, samples of the feed and the permeate were analyzed by atomic absorption. Concentrations of the metals in parts per million along with the percent passage calculated therefrom are shown in the Table.

EXAMPLE 8

A portion of the film from Example 7, Part B, was washed in a dilute aqueous solution of a commercial detergent (Lakeseal®) and rinsed with water prior to testing by the procedure of Example 7, Part C. The flow rate was 10 g.f.d. and the results are shown in the Table.

EXAMPLE 9

Part A

A portion of the aromatic polyamide hydrazide membrane from Example 3, Part A, was mounted in the apparatus of Example 1 with the skin side of the membrane toward the feed side of the permeator. A solution of 0.5 g. of KCN in 250 ml. of distilled water was placed in the permeator under a pressure of 1250 p.s.i. Under these conditions, permeate passed through the membrane at a rate of 25 g.f.d. After the volume of the feed solution had decreased by about 10%, the feed contained 1250 p.p.m. potassium and the permeate contained 49 p.p.m. potassium. The potassium passage was 4.0%. Results are summarized in the Table.

Part B

The permeator was rinsed with distilled water without changing the membrane. A solution of 0.50 g. of KCN, 0.30 g. of K₃Cu(CN)₄, 0.30 g. of AgCN and 0.10 of KAu(CN)₂ in 250 ml. of distilled water was placed in the permeator under 1250 p.s.i. pressure. Under these conditions, permeates passed through the membrane at a rate of 28 g.f.d. After the volume of the feed solution had decreased about 10%, the feed and permeate were analyzed by atomic absorption. Results are summarized in the Table.

EXAMPLE 10

Part A

Silver ore estimated to contain about 100 p.p.m. silver was pulverized until 80% passed through a 325-mesh screen. A cyanide leach solution was prepared by dissolving 0.50 g. of potassium cyanide in 500 ml. of nitrogen sparged distilled water, and 250 g. of pulverized ore was added. The container was swept briefly with nitrogen and then closed. The mixture was stirred at room temperature for 4.5 hours. After two hours settling the supernatant liquid was siphoned off and pressure filtered through a medium porosity glass frit to give 400 ml. of leach liquor. Atomic absorption analysis showed about 16 p.p.m. silver and about 410 p.p.m. potassium in the leach liquor.

Part B

A section of the wet tubular membrane from Example 1 Part B was slit open and mounted flat in a permeation cell functionally like the apparatus of Example 1, in which all metal parts were coated with polytetrafluoroethylene. The side of the membrane originally on the inside of the tube faced the feed solution. Leach liquor from Part B (368 ml.) containing about 16 p.p.m. silver and about 410 p.p.m. potassium was placed in the cell and the cell pressured to 1500 p.s.i. with nitrogen. This pressure was maintained until 42 ml. of concentrated liquor remained in the cell, the remainder having passed through the membrane. The flow rate was about 30 g.f.d. Atomic absorption analysis showed 153 p.p.m. silver in the concentrated liquor. In the permeate the silver content was below 1 p.p.m. and the potassium content was below 60 p.p.m.

and copper, wherein aqueous alkali or aqueous alkaline earth metal cyanides are employed as leaching agents, and wherein the gold, silver and copper complex cyanides are subsequently concentrated from the leach liquid, the improvement comprising, contacting one surface of a semi-permeable membrane with the leach liquid under pressure in excess of the osmotic pressure thereof, some of which liquid flows through said membrane, and concentrating gold, silver and copper complex cyanides by retention thereof on the side of the membrane surface contacted with the leach liquid, said membrane consisting essentially of at least one polymer of the formula

wherein
(a) each L independently is a divalent linking group of the formula $-(A_iB_jA_kB_lA_m)-$, wherein

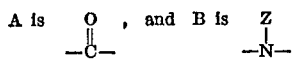

TABLE[1]

| Example | | K | Cu | Ag | Au | GFD | Pressure (p.s.i.) | | |
|---|---|---|---|---|---|---|---|---|---|
| 1 | Feed, p.p.m. | 1,750 | 430 | 365 | 250 | | | 7 | 400 |
| | Permeate, p.p.m. | 133 | 11 | 6 | 29 | | | | |
| | Percent passage | 7.6 | 2.6 | 1.6 | 11 | | | | |
| 2 | Feed, p.p.m. | 1,500 | 440 | 310 | 265 | | | 20 | 1,050 |
| | Permeate, p.p.m. | 218 | 1.5 | 1 | 13.6 | | | | |
| | Percent passage | 15 | 0.3 | 0.3 | 5 | | | | |
| 3 | Feed, p.p.m. | 1,550 | 560 | 334 | 252 | | | 10 | 750 |
| | Permeate, p.p.m. | 153 | 3 | 4 | 7 | | | | |
| | Percent passage | 10 | 0.5 | 1.2 | 3 | | | | |
| 4 | Feed, p.p.m. | 1,675 | 378 | 1,500 | 415 | | | 23 | 1,230 |
| | Permeate, p.p.m. | 75 | 2 | 4.6 | 12.5 | | | | |
| | Percent passage | 5 | 0.5 | 0.3 | 3 | | | | |
| 5 | Feed, p.p.m. | 1,920 | 322 | 1,560 | 400 | | | 24 | 1,250 |
| | Permeate, p.p.m. | 61 | 2 | 4.6 | 7 | | | | |
| | Percent passage | 3 | 0.6 | 0.3 | 2 | | | | |
| 6 | Feed, p.p.m. | 1,690 | 520 | 480 | 240 | | | 2.7 | 750 |
| | Permeate, p.p.m. | 226 | 28 | 2 | 43 | | | | |
| | Percent passage | 13 | 5 | 0.4 | 18 | | | | |
| 7 | Feed, p.p.m. | 1,840 | 490 | 1,020 | 315 | | | 7.5 | 750 |
| | Permeate, p.p.m. | 118 | 6 | 4.2 | 35 | | | | |
| | Percent passage | 6.4 | 1.2 | 0.4 | 111 | | | | |
| 8 | Feed, p.p.m. | 1,670 | 440 | 740 | 252 | | | 10 | 750 |
| | Permeate, p.p.m. | 31 | 3.2 | 2 | 3 | | | | |
| | Percent passage | 1.9 | 0.7 | 0.3 | 1.2 | | | | |
| 9A | Feed, p.p.m. | 1,250 | None | None | None | | | 25 | 1,250 |
| | Permeate, p.p.m. | 49 | | | | | | | |
| | Percent passage | 4.0 | | | | | | | |
| 9B | Feed, p.p.m. | 1,875 | 410 | 1,750 | 360 | | | 28 | 1,250 |
| | Permeate, p.p.m. | 57.5 | 0.05 | 2.5 | 0.2 | | | | |
| | Percent passage | 3.1 | 0.01 | 0.14 | 0.06 | | | | |

[1] The summary data in this table reflect the actual metal content of the feed solutions at the time of testing.

The complex cyanides, $Au(CN)_2^-$, $Ag(CN)_2^-$ and $Cu(CN)_2^-$, are linear species with approximately the same diameter as the cyanide ion. Since the four species have approximately equal diameters, it might be expected that the complex cyanides of copper, silver and gold would show approximately the same tendency to pass through the membranes as potassium cyanide. However, this is not so. Looking at Example 9B in the Table, it is seen that the gold, silver and copper complex cyanide ions show a percent passage less than $\frac{1}{20}$ that of the potassium cyanide.

From the Table, it appears that at the lower flow rates the complex cyanide of gold and to a lesser extent the complexes of silver and copper, show approximately the same tendency to pass through the membranes as potassium cyanide in accord with the discussion above. Consequently, for best results in concentrating the gold, silver and copper coinage metals and in separating potassium therefrom, it is most preferred to maintain the process at a flow rate of at least about 10 g.f.d.

The embodiments of the invention in which an exclusive property or privilege is claimed are defined as follows:

1. In a leaching process for obtaining aqueous solutions of the soluble complex cyanides of gold, silver, or vice versa; each Z independently is H, lower alkyl, or phenyl, provided that at least ¼ of the Z's in the polymer are H; and all non-terminal

occur in pairs; $i$ and $j$ each represent the numerals 1 or 2; $k$, $l$, and $m$ each represent the numerals 0, 1, or 2; provided that if $l=0$, then $m=0$; and if $k=0$, then $l=0$; and further that $i+j+k+l+m \leqslant 8$, (b) each R independently is a divalent organic radical, both of whose terminal atoms are carbon atoms, at least about ½ of all such terminal atoms bonded to

and at least about ⅔ of all such terminal atoms bonded to

in the L links being members of aromatic nuclei; and such that (i) $(\bar{N}_R)/(\bar{s})$ is less than about 10, (ii) $f_m$ is less than about $\frac{1}{5}$, and (iii) P.I. is less than about $\frac{1}{500}$, where:

$$N_R = N_R{}^\circ - 10N_I - N_H$$

$N_R{}^\circ =$ (number of atoms in R, exclusive of H-atoms) $\leqslant 50$, $N_I =$ number of ionic groups in R, $N_H =$ (number of H-bonding units contributed by polar groups in R, $\bar{N}_R =$ average value of $N_R$ for the polymer, $s = \frac{1}{2}$ ((number of

groups in L)+1), $\bar{s} =$ average value of $s$ for the polymer, $$f_m = \frac{\text{(number of single-strand —M— links in the polymer chain)}}{\text{(total number of atoms, exclusive of H-atoms in polymer chain)}},$$

M = any atom in R linking the polymer chain solely through two single bonds, $$\text{P.I.} = \frac{\text{(total number of pendant ionic groups in the polymer)}}{\text{(polymer molecular weight)}},$$

(c) $n$ is an integer sufficiently large to provide film-forming molecular weight, and
(d) the polymer has a solubility of at least about 10% by weight of a medium consisting of 0–3% by weight of lithium chloride in a solvent selected from the group consisting of dimethylacetamide, dimethylsulfoxide, N-methyl pyrrolidone, hexamethyl phosphoramide, and mixtures thereof at 25° C.

2. The process of claim 1 wherein said membrane is an aromatic polyamide.
3. The process of claim 1 wherein said membrane is an aromatic polyacyl hydrazide.
4. The process of claim 1 wherein said membrane is an aromatic copolymer or polyamide/polyacyl hydrazide.
5. The process of claim 1 wherein said membrane is an aromatic polysemicarbazide.
6. The process of claim 1 wherein said membrane is an aromatic polyurea.
7. The process of claim 1 operated at a temperature from 0° C. to 100° C. and a pressure from 100 p.s.i. to 2500 p.s.i.
8. The process of claim 7 wherein the flow rate of liquid through said membrane is at least about 10 gallons/square foot/day.
9. The process of claim 1 wherein said membrane is between 0.1 and 25 mils in thickness.

References Cited
UNITED STATES PATENTS

| | | | |
|---|---|---|---|
| 2,273,569 | 2/1942 | Goette | 423—29 |
| 3,567,632 | 3/1971 | Richter et al. | 210—23 |
| 3,615,553 | 11/1971 | Westaway et al. | 210—23 |
| 3,567,630 | 3/1971 | Lukach | 210—23 |

OSCAR R. VERTIZ, Primary Examiner

H. S. MILLER, Assistant Examiner

U.S. Cl. X.R.

210—23

UNITED STATES PATENT OFFICE
CERTIFICATE OF CORRECTION

PATENT NO. : 3,816,587
DATED : June 11, 1974
INVENTOR(S) : Lawrence Wayne Gosser It is certified that error appears in the above-identified patent and that said Letters Patent are hereby corrected as shown below:

Column 3, line 25 the first "of" should be --in--.

Column 4, line 5 "m-phenylene" should be --p-phenylene--.

Column 6, line 54 "KAu(CN)" should be --KAu(CN)$_2$--.

Column 6, line 58; Column 7, line 70; Column 8, lines 28, 40, 51, and 64; Column 9, lines 20 and 70 "g.f.d." should be --GFD--.

Column 7, line 6 the second "with" should be --was--.

Column 8, line 17 "LinNO$_3$" should be --LiNO$_3$--; and "1,11-diacetyl" should be --2,11-diacetyl--.

Column 9, line 25 column headings "K, Cu, Ag, Au, GFD and Pressure (p.s.i.)" should be displaced two columns to the right.

UNITED STATES PATENT OFFICE
CERTIFICATE OF CORRECTION

Patent No. 3,816,587      Dated June 11, 1974

Inventor(s) Lawrence Wayne Gosser      Page 2

It is certified that error appears in the above-identified patent and that said Letters Patent are hereby corrected as shown below:

Column 9, Example 7 - percent passage of Au "111" should be --11--.

Column 12, line 8 "or" should be --of--.

Column 12, line 21 "and" should be --to--.

Signed and sealed this 27th day of May 1975.

(SEAL)
Attest:

RUTH C. MASON
Attesting Officer

C. MARSHALL DANN
Commissioner of Patents
and Trademarks